UNITED STATES PATENT OFFICE.

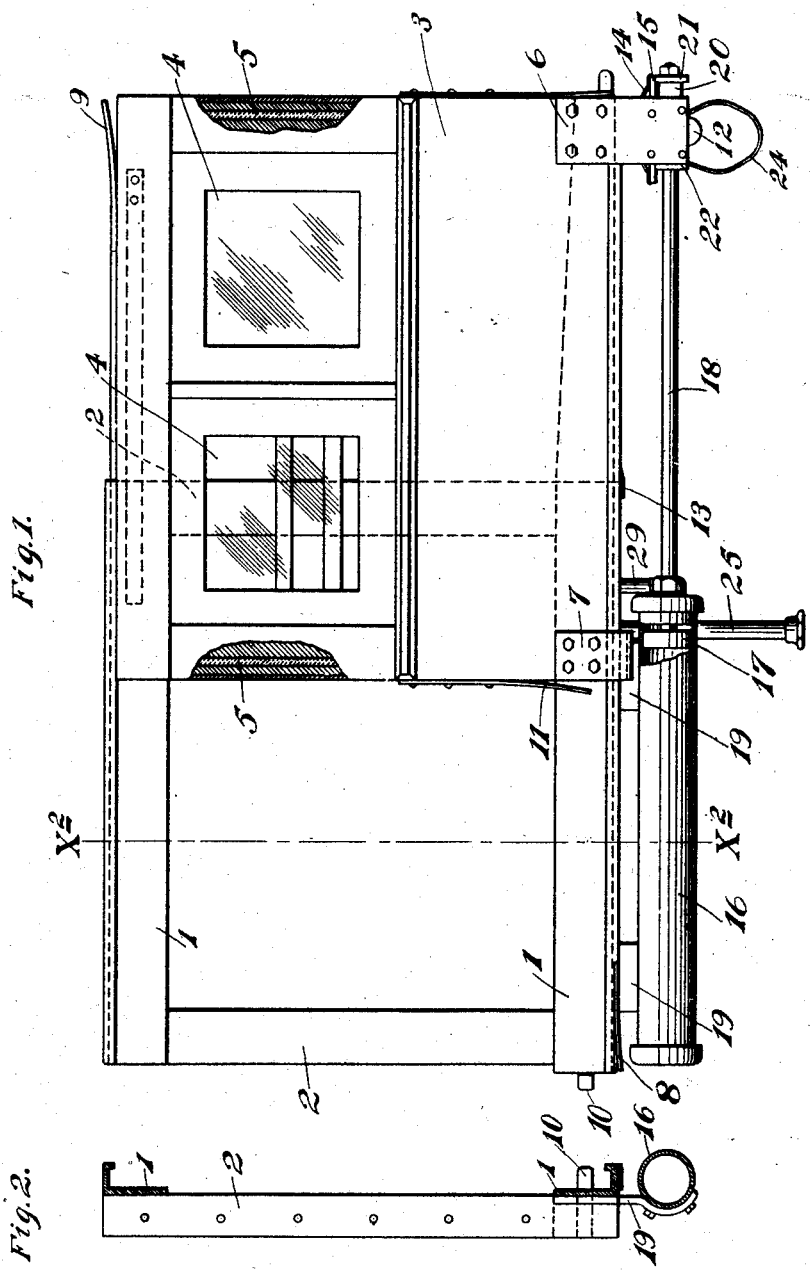

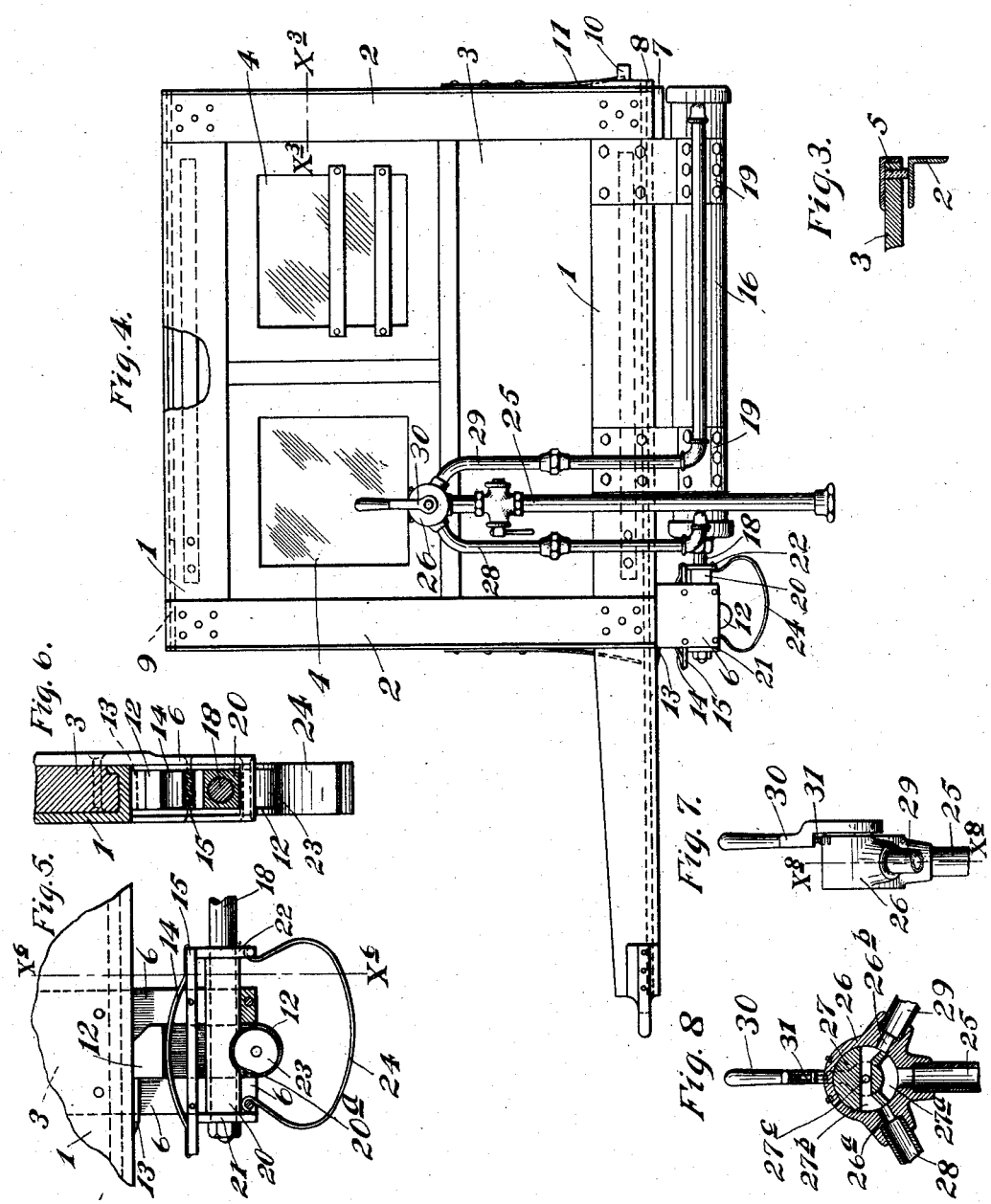

JOHN N. HOLM, OF MINNEAPOLIS, MINNESOTA.

SLIDING SIDE PANEL FOR LOCOMOTIVE-CABS.

No. 902,231.  Specification of Letters Patent.  Patented Oct. 27, 1908.

Application filed March 23, 1908. Serial No. 422,681.

*To all whom it may concern:*

Be it known that I, JOHN N. HOLM, a citizen of the United States, residing at Minneapolis, in the county of Hennepin and State of Minnesota, have invented certain new and useful Improvements in Sliding Side Panels for Locomotive-Cabs; and I do hereby declare the following to be a full, clear, and exact description of the invention, such as will enable others skilled in the art to which it appertains to make and use the same.

My invention relates to locomotive cabs and has for its object to provide a simple and efficient device by means of which one or both of the frames or panels of the cab may be slid from a normal into a position which will open up the side of the cab and permit the engineer or fireman, or both, to quickly jump from the cab whenever a collision is about to take place.

To the above ends the invention consists of the novel devices and combinations of devices hereinafter described and defined in the claims.

In the accompanying drawings which illustrate the invention, like characters indicate like parts throughout the several views.

Referring to the drawings, Figure 1 is a view in elevation with some parts sectioned and with some parts removed, showing my invention applied to the frame-work of the locomotive cab, said parts being viewed from the outer side of the cab, and the sliding side frame or panel of the cab being moved into a position to open up the side of the cab. Fig. 2 is a section taken on the line $x^2\ x^2$ of Fig. 1. Fig. 3 is a detail in horizontal section, on the line $x^3\ x^3$ of Fig. 1. Fig. 4 is an elevation of the parts shown in Fig. 1, looking at the same from the interior of the cab and showing the sliding side frame or panel of the cab in its closed or normal position. Fig. 5 is a detail view in side elevation, showing a lock mechanism for normally securing the sliding side frame or panel in its normal or closed position. Fig. 6 is a vertical section taken approximately on the line $x^6\ x^6$ of Fig. 5. Fig. 7 is a rear elevation of a three-way valve device for controlling the reciprocating motor which is used to impart movements to the sliding side frame or panel of the cab; and Fig. 8 is a vertical section taken on the line $x^8\ x^8$ of Fig. 7.

In the drawings only one side of the cab frame structure is shown, and of the parts thereof it is only necessary for the purposes of this case to note that the fixed side framework of the cab is of rectangular form and is made up of upper and lower horizontally extended channeled metal guide bars 1 and upright posts 2 rigidly connecting the ends thereof.

The sliding side frame structure of the cab, hereinafter designated as the movable or sliding panel, is indicated as an entirety by the numeral 3, and the upper and lower edges of this panel are arranged to slide in channels of the upper and lower channel bars 1. The said panel, as shown, is provided with the usual cab side windows 4 and the vertical end posts thereof are shown as provided with inset joint strips 5 of felt or other suitable material, the projecting edges of which, when the panel is in normal or closed position, engage the fixed frame posts 2 and form tight joints therewith. Secured to the ends of the sliding panel 3 and depending therefrom are yoke-like brackets 6 and 7. The lower end of the bracket 7 projects laterally under the lower channeled guide rail 1 and is adapted to engage with a leaf spring 8 secured to the latter when the said panel is in its normal or closed position. To the upper edge of the panel 3 is secured a slightly up-turned leaf spring 9, which, when the panel is in its closed or normal position, engages one end of the upper channeled guide rail 1. The two springs 8 and 9 serve to prevent rattling of the panel 3 when the latter is in its normal or closed position. On the rear end of the lower guide rail 1 is a laterally projecting stop lug 10 with which a leaf spring 11, carried by the rear edge of the panel 3, engages and acts as a cushion when the said panel is slid rearward to its normal position.

Mounted to slide vertically in yoke-like brackets 6 is a lock bolt 12, best shown in Figs. 5 and 6, which bolt normally engages with a lock lug 13 rigidly secured on the bottom of the lower rail 1 to lock the sliding panel 3 in its normal or closed position. The lock bolt 12 is yieldingly pressed upward, as shown, by a bowed spring 14 that reacts against a bar 15 rigidly secured to the bracket 6.

The sliding cab panel is adapted to be quickly moved from its normal to its open position, or vice versa, by means of a straight line reciprocating engine, which may be actuated either by steam or compressed air, the former of which would be supplied from the engine boiler, and the latter of which could be supplied from the air storage reservoir of the air brake apparatus. This reciprocating engine is preferably of standard construction and comprises a cylinder 16 and a piston 17, the latter of which has the usual stem 18 working through a suitable stuffing box in one of the cylinder heads. The cylinder 16 is located below and extends parallel to the lower fixed guide rail 1 and, as shown, is rigidly secured thereto by tie plates 19. The piston stem 18 projects toward the front of the engine and the said cylinder and piston stem are long enough to effect the proper sliding movements of the panel 3 from its normal to its open position, and vice versa. At its forwardly projecting end the piston rod 18 is shown as provided with a fixed sleeve 20 having push flanges or heads 21 and 22 at its ends. The sleeve 20 extends through the yoke-like bracket 6 and its flanges 21 and 22 are arranged to engage with the front and rear edges, respectively, of the said bracket, but spaced apart so that the piston 18 must be given a slight endwise movement in order to move the said flanges alternately into engagement with said bracket. The under surface of the sleeve 20 is notched at 20$^a$ for engagement with a small wheel 23 which is mounted on the lower end of the lock bolt 12, all as best shown in Fig. 5. A U-shaped spring 24, shown as attached at one end to the bracket 6 and at its other end to the push flange 22, tends normally to hold the piston 17 and its stem 18 in its rearmost position, as shown in Figs. 4 and 5.

The steam or air from a suitable source of supply is conveyed through a pipe 25 to a three-way valve 26—27 of standard construction. The casing 26 of the said three-way valve has ports 26$^a$ and 26$^b$ that are connected by pipes 28 and 29 to the opposite ends of the cylinder 16. The movable member of the said three-way valve is provided with an admission port 27$^a$ and with an exhaust port 27$^b$, which latter has an axial discharge passage 27$^c$. To the outer end of the stem of the movable valve 27 is secured a lever 30 having a latch 31 engageable with notches in the casing 26 to set the said valve 27 in any one of three positions.

In the position of the valve 27 shown in Fig. 8 the supply of live steam or air is cut off from the cylinder 16 and both ends of the cylinder are open to exhaust. When the said valve 27 is oscillated in one direction, one end of the cylinder will be connected to the supply pipe 25 and the other end thereof to the exhaust, so that the piston, and consequently the sliding panel 3, will be moved in a forwardly direction. It is, of course, evident that by a reverse oscillatory movement of the controlling valve 27 the piston may be caused to move in a reverse direction, to-wit, in a direction to move the sliding panel from its open back to its closed position.

Attention is now particularly called to Fig. 5, which shows the position of the parts therein illustrated when the sliding panel is in its normal or closed position. The initial movement of the piston stem 18 in a forwardly direction, to-wit, in the direction of the arrow marked adjacent thereto in Fig. 5, causes the notched portion 20$^a$ of the sleeve 20 to act as a cam upon the roller 23 and thereby move the lock bolt 12 downward so as to release the latter from the lock lug 13 on the lower fixed rail 1. This, as is evident, unlocks the sliding panel, and it is important to note that this will take place before the push flange 22 is thrown into engagement with the bracket 6 of the said sliding panel. After the sliding panel has thus been unlocked and the push flange 22 has been engaged by the bracket 6, further forward movement of the piston will force the sliding panel forward or from its normal into its open position, shown in Fig. 1.

Under return or rearward movement of the piston the latter will move backward until the push flange 21 is engaged with the bracket 6 and further return movement thereof will carry the sliding panel with it until it has reached its normal or closed position. Under the final portion of this return movement the beveled upper end of the lock bolt 12 engages the beveled extremity of the lock lug 13 and the two are again automatically engaged by the spring 14, thereby again locking the sliding panel in its closed position.

As is evident, the engineer or fireman may, in case collision is about to take place, instantly cause the sliding panel of the cab to be thrown into an open position by a simple movement of the valve actuating lever 30. This enables the engineer, in case of impending collision, to stick to his post to the very last moment and then to make his escape through the open side of the cab. Also it prevents the engineer and fireman from being pinned within the cab.

What I claim is:

1. An engine cab provided with a side panel adapted to be moved to open up the side of the cab, in combination with a motor arranged to move said panel from its closed into an open position, substantially as described.

2. An engine cab provided with a side panel adapted to be moved to open up the side of the cab, in combination with a fluid-actuated motor arranged to move said panel from its closed into an open position, substantially as described.

3. An engine cab having a panel mounted to slide to and from a closed position, in combination with a straight line reciprocating fluid-actuated motor, connected to said panel for imparting sliding movements thereto, and a lock normally holding said panel in its closed position but arranged to be released by the initial action of the engine, substantially as described.

4. An engine cab provided with a panel forming the entire side of the cab and arranged to open up the entire side of the cab.

In testimony whereof I affix my signature in presence of two witnesses.

JOHN N. HOLM.

Witnesses:
H. D. KILGORE,
M. E. RONEY.